Feb. 21, 1967 D. R. BARBER 3,305,857
DECODING EQUIPMENT
Filed March 30, 1964
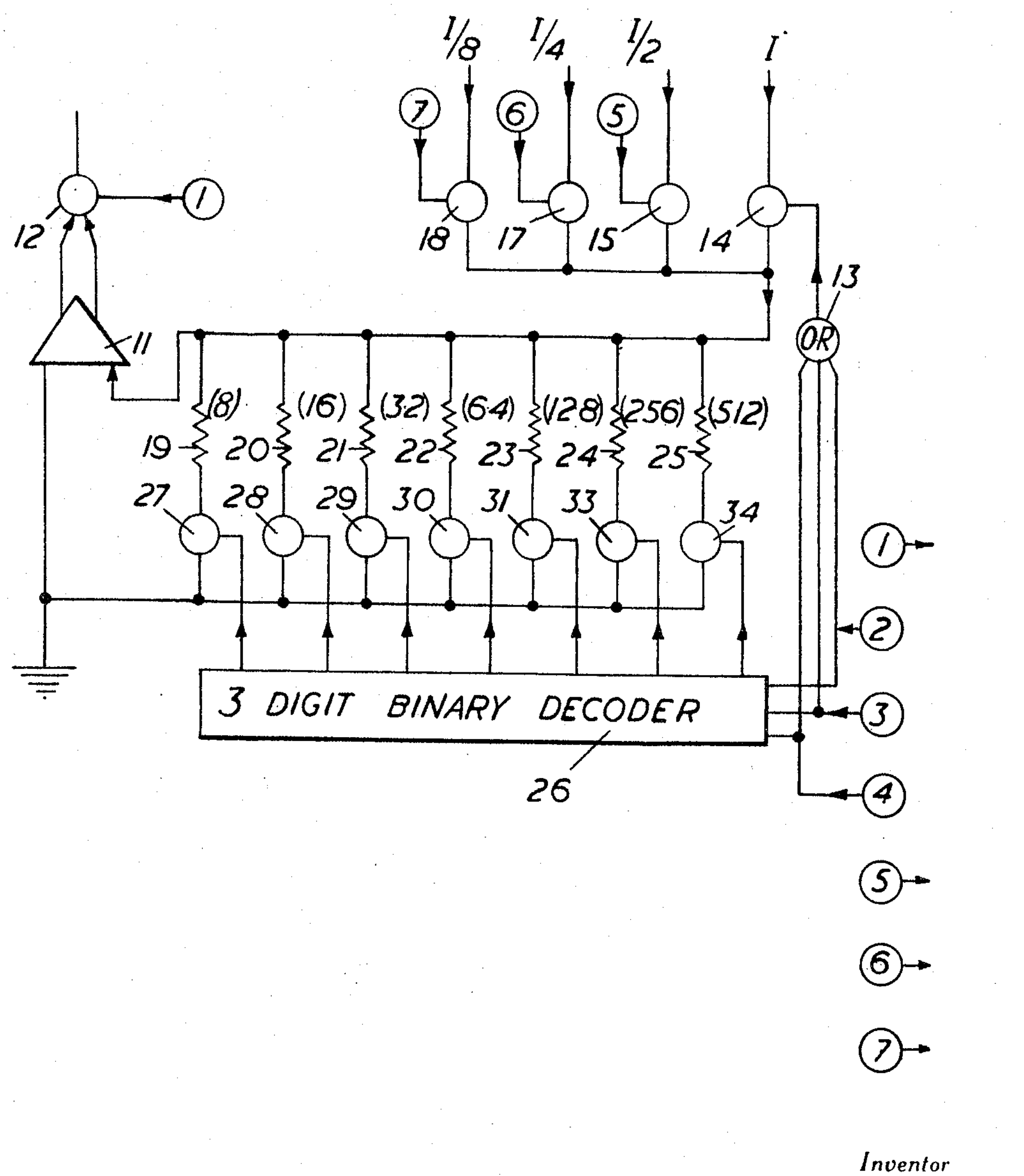
Inventor
DONALD R. BARBER
By Philip M. Bolton
Attorney

United States Patent Office 3,305,857
Patented Feb. 21, 1967

3,305,857

DECODING EQUIPMENT

Donald Robert Barber, London, England, assignor to International Standard Electric Corporation, New York, N.Y., a corporation of Delaware Filed Mar. 30, 1964, Ser. No. 355,650
Claims priority, application Great Britain, Apr. 17, 1963, 15,070/63
11 Claims. (Cl. 340—347)

This invention relates to digital to analog converters, or decoding equipment, especialy, but not exclusively, for use in pulse code modulation (hereinafter called P.C.M.) systems of communication.

According to this invention there is provided decoding equipment which derives from a code combination having $x$ digits a signal representing an $n$ digit code combination, wherein such $x$-digit code combination corresponds to a selected group of $m$ digits in a code combination having $n$ digits, where $x$ is less than $n$.

According to this invention there is also provided decoding equipment for use in a P.C.M. communication system, in which a sample of a signal wave is generated in one of a number of levels each of which is represented by a code combination in an $x$-digit binary code, said code combination having been derived from an $n$-digit code combination representing one of a number of levels into which a sample of a signal wave has been quantized, where $x$ is less than $n$, and in which said $x$-digit code combination represents the position and value of the $m$ most significant digits of the corresponding $n$ digit code combination.

According to the present invention there is further provided a digital to analog conversion arrangement, in which the digital code combination to be converted is in two portions, the first of which represents by $x$ digits the position of the most significant digit in the combination and the second portion of which represents the value of the $m$ most significant digits thereof, the $(x+m)$ digits representing an $n$ digit combination where $n>(x+m)$, in which means is provided to generate an electrical current whose magnitude is characteristic of said second portion of the code combination to be converted, and in which said electrical current is applied to an amplifying arrangement whose gain is adjusted in accordance with said first portion of the code combination to be converted, whereby the output from said amplifier has a value representative of the value of the $n$ digit combination which the received code combination represents.

An embodiment of the invention wil now be described with reference to the accompanying drawing which is a block diagram of a P.C.M. decoder embodying the present invention.

The decoder described below is based on the use of a code having a relatively small number of digits, this being possible at the cost of some error. An example in which some error can be tolerated is where a measuring instrument can measure a quantity to 6-digit accuracy and only 4-digit accuracy is needed. In such a case the result of each measurement can be simplified by taking only the four most significant digits, plus an indication of the denominational significance of a selected digit (usually the most significant of the four). This simplification is effected at the cost of some error the size of which varies with the amplitude of the measured quantity.

As an example, if binary notation is used, with four significant digits only, the degree of error varies from 12½ to 6¼%. Thus, if the analog quantity has a value 10000, i.e. level (or amplitude) 16, this would be quoted, usng four significant digits as 1000(0). The next higher value which can be conveyed, using four significant digits, is 1001 (which represents level or amplitude 18). The difference of two levels when expressed in four binary digits is equal to an error of 12½%. On the other hand, the next lower level which can be conveyed, using four significant digits, is 1111, which represents level 15. The difference of one level when expressed in four binary digits is equivalent to an error of 6¼%.

Similarly, in the case of level 32, which is represented, using four significant digits, as binary 1000, the next higher value which can be conveyed is 1001 and the next lower value which can be conveyed is 1111 representing levels 36 and 30, respectively. Here again, when these differences are considered in the context of the four most significant binary digits, the error in the first instance is 12½% and in the second instance is 6¼%. When using four significant digits in this way to convey values originally in five significant digits, the digital significance of combination's digits must be borne in mind to obtain the proper value.

To revert to decimal notation, where a large number is involved, e.g. 1,234,000, it is common to represent it as a single decimal number less than 10 followed by a power of 10. Thus, the above number is often represented as $1.234\times10^6$. The information is therefore in two portions:

(a) A number giving the value within the decade. This in the above example is 1.234, and is analogous to the mantissa of a logarithm.

(b) A separate portion showing which decade the number is in. In the above example this is 6, i.e. this means that portion (a) must be regarded as multiplied by $10^6$. This portion is analogous to the characteristic of a logarithm.

In the above example, the number could be transmitted as 12346 (assuming that the power of 10 does not exceed 9), in which case the first four digits are interpreted as conveying portion (a) and the fifth digit is interpreted as conveying portion (b). The most important uses of this technique are P.C.M. systems using binary codes, where it allows a reduced number of digits to be sent. However, the technique can be used in non-binary, e.g. ternary codes and also where the systems use non-electronic, e.g. mechanical techniques.

To explain the technique, a system is considered in which analog values to be handled lie between 8 and 1023. The first step in dealing with an analog value is to convert that value, which is a speech wave signal in P.C.M. telephony, into a binary code combination using any convenient form of 10-digit coder. The maximum permissible error in the final code is assumed to be 12½%, which is the maximum error which occurs when taking only the four most significant binary digits. The first digit of such a block of four digits must always be 1 so need not be sent. Consequently, the information which must be sent for portion (a), above, is a set of three binary digits. In extracting these sets of three digits from the code combinations, the binary values are dealt with in octaves. Octave 1 is the analog range 8–15, expressed in 10-digit binary code as 0000001000 to 0000001111, octave 2 is the analog range 16–31, i.e. code combinations 0000010000 to 0000011111, and so on. When the numbers in octave 2 are dealt with on the basis of only 4 significant digits, the range is expressed as 000001000 to 000001111. This has the above-mentioned maximum error percentage of 12½%. Since the difference between adjacent code combinations is two units, this range is said to have a quantum jump of 2.

The code group which gives the four most significant digits, and which corresponds to portion (a), above, is known as the octave position group, and (as already mentioned) can be given as a three digit combination. This, as mentioned above, is because the first of the four most significant digits is always 1, and so need not be sent. Thus, the octave position is sent as a group of three binary digits to which a digit 1 is added at the higher value end on reception.

The information corresponding to portion (b) above, known as the octave number, gives the location within the 10-digit code combination of its most significant digit, of the block of four most significant digits. As the lowest analog value is assumed to be 8, there are only seven possible values for the octave number. The octave number, being seven or less, is expressed as a 3-digit binary code combination.

Continuing the logarithm analogy mentioned above, the octave position is analogous to the matissa and the octave number is analogous to the characteristic of the logarithm.

To signal the binary code combination for a signal sample, the three digits which form the octave position are combined with the three digits of the octave number to form a 6-digit code combination. Thus, a reduction in the number of digits to be sent from 10 to 6 is obtained, with consequent economy, as nearly half the bandwidth is saved. The output can be in parallel on 6 separate channels, or serial, using a single channel, or a serial-parallel arrangement could be used.

In some cases it may be necessary to be able to handle the values from 0 to 7, referred to herein as octave 0. The numbers in this range have quantum jump 1, and the octave number is, of course, 000.

For the analog value 255, the 10 digit code combination is 0011111111. The octave position group in full (i.e. all four digits) is 1111, but as the first is not sent the octave position group as sent is 111, and the octave number, which gives the location of the most significant digit is 5. The code for this digit is actually 3 less than the actual position of that digit. Consequently, as the four most significant digits are used, this group represents the position of the least significant digit of the four most significant digits. Thus, in the example given, the code combination sent is 111–101 or 101–111, where the information is sent serially, depending on which portion is sent first.

The coding of a quantized signal sample in the manner described above is described in the copending U.S. patent application of A. H. Reeves and D. R. Barber, Serial No. 338,410, filed January 17, 1964, entitled "Coding Equipment."

Referring now to the accompanying block diagram, which shows a decoder for decoding a code such as described above, the incoming digits received over the transmission channel are represented by the column of circles, numbered 1–7, on the right hand side of the diagram.

The digit 1 has been added to the six-digit code (described above) to convey information as to the polarity of the signal sample originally quantized at the transmitter. The remaining digits 2–7 convey the information indicating the quantizing level into which the signal sample has been quantized. Thus, digits 2–4 represent the octave number in the manner described above, while digits 5–7 represent the octave position group.

The purpose of decoding the incoming code combination is to generate a signal sample which is the equivalent (within the permissible error limits stated above) of the signal sample originally quantized and encoded at the transmitter.

When the incoming code is received, it is converted from a serial form to a parallel form and stored in an incoming register prior to decoding. The circles numbered 1–7 may, therefore, be regarded as digits stored in a 7-digit incoming register.

The output signal is generated by the differential amplifier 11, which, in response to the decoding of digits 2–7, produces two outputs of equal amplitude but opposite polarity. The amplifier has fixed gain, and the amplitude of the outputs is directly proportional to the value of the input. The appropriate output is selected by the gate 12 which is set by digit 1.

The input to the differential amplifier is provided by the constant current sources I, I/2, I/4 and I/8. These sources correspond to any four consecutive digits in the original 10-digit code (of which the six digits 2–7 represent the four most significant digits), and, therefore, the difference between each constant current source and the next source represents a quantum jump of 2. The constant current source I corresponds to the most significant of the four digits selected from the 10-digit code.

If any one of the digits 2–4 of the received code are binary 1 digits, this must mean that the most significant digit of the original 10-digit code was in at least octave number 1. (If it was in octave number 0, then, taking the four most significant digits, the most significant digit would have been an "0," e.g. 0000000111. Digits 2–7 would then have been 000111.)

Any one of digits 2–4 will operate the "OR" gate 13, which in turn opens the gate 14 and connects the constant current source I to the input of the differential amplifier 11.

The digits 5–7 are used to open the gates 15, 17, and 18, thus, add current from one or more of the appropriate constant current sources I/2, I/4 and I/8 to the amplifier input.

Thus, it can be seen that current from one or more of the constant current sources I, I/2, I/4, and I/8 can represent any four consecutive digits in the 10-digit code. It only remains for the position of these four digits within the code to be determined. This is achieved by shunting across the input to the amplifier 11 one of a series of seven weighting resistors 19–25. These resistors are graded in value so that the lowest value resistor 19 corresponds to octave number 1 (equivalent to decimal 8), resistor 20 corresponds to octave number 2 (decimal 16) and so on. The appropriate resistor is selected by decoding the digits 2–4 in a three-digit decoding matrix 26 to give a one-out-of-seven output, which is applied to the corresponding one of gates 27–31, 33 and 34. When the selected gate is opened that resistor is shunted across the amplifier input, and the current applied to the amplifier input from the constant current sources is reduced accordingly. Consequently, the current applied from the constant current sources to the combination of amplifier 11 and the selected one of the shunt resistors is amplified by a constant whose magnitude is determined by the location of the most significant digit in the 10 digit code.

As already mentioned the amplifier gives two outputs of the same amplitude but different polarity and these are offered to the device 12, referred to above as a gate. The condition of the polarity digit in the code combination as received, i.e. whether digit 1 is 1 or 0, determines which of these two outputs is effective.

Then an output signal is obtained of the same polarity as the sample represented by the 10 digit code, and combinations of the current amplitude therefore, within the range of permissible error.

In the case of a P.C.M. decoder, the samples generated in response to the successively-received codes are applied to a filter/amplifier arrangement in well-known manner to reconstitute the speech.

It is to be understood that the foregoing description of specific examples of this invention is made by way of example only and is not to be considered as a limitation on its scope.

What I claim is:

1. Decoding equipment comprising:

a first source of code combinations each having at least a first group of code digits and a second group of code digits;

a plurality of constant current sources, each of said sources providing a constant current having a predetermined by different weighted values;

a current combining output means;

a first means coupled to said first source and a selected one of said current sources responsive to a given value of any one of the digits of said group of digits to couple said selected one of said current sources to said output means;

second means coupled to said first source and the others of said current sources responsive to a given value of associated ones of the digits of said second group of digits to couple said others of said current sources to said output means; and third means coupled to said first source and said output means responsive to the combined values of the digits of said first group of digits to adjust the value of the combined constant currents in said output means to provide at the output of said output means the analog signal represented by each of said code combinations.

2. Decoding equipment according to claim 1, wherein said selected one of said current sources is that current source providing the highest weighted value of constant current.

3. Decoding equipment according to claim 1, wherein said code combinations are binary code combinations; and said given value of digits of said first and second groups of digit is a binary "1".

4. Decoding equipment according to claim 1, wherein said first group of digits include $x$ digits indicating the position of the $m$ most significant digits of an $n$ digit code combination; and said second group of digits are the $m$–1 least significant digits of said $m$ most significant digits;

where $x+m$ is less than $n$.

5. Decoding equipment according to claim 1, wherein said code combinations further include an additional digit whose value indicates the polarity of the analog signal from which said first and second groups of digits were derived; and said output means includes an amplifier responsive to said adjusted value of the combined currents to produce two analog output signals of equal amplitude but opposite polarity, and fourth means coupled to said amplifier output and said first source responsive to the value of said additional digit to select the appropriate polarity of said analog signal from said amplifier.

6. Decoding equipment according to claim 1, wherein said third means includes a plurality of predeterminedly different weighted resistors, and fourth means coupled to said first source and said resistors responsive to the combined values of the digits of said first group of digits to couple the appropriate one of said resistors to said output means to adjust the value of said combined constant currents.

7. Decoding equipment according to claim 6, wherein said fourth means includes a decoding means having a different appropriate output coupled to each of said resistors, each of said outputs being activated by a different appropriate combination of the values of the digits of said first group of digits.

8. Decoding equipment according to claim 1, wherein said selected one of said current sources is that current source providing the highest weighted value of constant current;

said code combinations further include an additional digit whose value indicates the polarity of the analog signal from which said first and second groups of digits were derived; and said output means includes an amplifier responsive to said adjusted value of the combined currents to produce two analog output signals of equal amplitude but opposite polarity, and fourth means coupled to said amplifier output and said first source responsive to the value of said additional digit to select the appropriate polarity of said analog signal from said amplifier.

9. Decoding equipment according to claim 8, wherein said third means includes a plurality of predeterminedly different weighted resistors, and fifth means coupled to said first source and said resistors responsive to the combined values of the digits of said first group of digits to couple the appropriate one of said resistors to said output means to adjust the value of said combined constant currents.

10. Decoding equipment according to claim 9, wherein said fifth means includes a decoding means having a different appropriate output coupled to each of said resistors, each of said outputs being activated by a different appropriate combination of the values of the digits of said first group of digits.

11. Decoding equipment according to claim 10, wherein said first group of digits include $x$ digits indicating the position of the $m$ most significant digits of an $n$ digit code combination; and said second group of digits are the $m$–1 least significant digits of said $m$ most significant digits;

where $x+m$ is less than $n$.

References Cited by the Examiner

UNITED STATES PATENTS

| | | | |
|---|---|---|---|
| 2,954,551 | 9/1960 | Doucette et al. | 340—347 |
| 2,957,943 | 10/1960 | Rack | 178—43.5 |
| 3,102,258 | 8/1963 | Curry | 340—347 |

MAYNARD R. WILBUR, *Primary Examiner.*

W. J. ATKINS, *Assistant Examiner.*